United States Patent [19]
Fontana

[11] 3,881,216
[45] May 6, 1975

[54] CASTER BRAKE AND LATCH ASSEMBLY

[75] Inventor: Frank J. Fontana, Fairfield, Conn.

[73] Assignee: Stewart-Warner Corporation, Chicago, Ill.

[22] Filed: Jan. 23, 1974

[21] Appl. No.: 435,687

[52] U.S. Cl. .................. 16/35 R; 188/1 D; 188/31
[51] Int. Cl. ............................................ B60b 33/00
[58] Field of Search ........ 188/1 D, 31, 69; 16/35 R, 16/35 D

[56] References Cited
UNITED STATES PATENTS

| | | | |
|---|---|---|---|
| 2,915,775 | 12/1959 | Skupas | 16/35 R X |
| 3,388,419 | 6/1968 | Crawford | 188/1 D X |
| 3,409,105 | 11/1968 | Clinton | 188/1 D X |
| 3,687,241 | 8/1972 | Fontana | 188/1 D X |

*Primary Examiner*—George E. A. Halvosa

[57] ABSTRACT

A caster brake and latch assembly consisting of a treadle pivotable about the axis of the caster wheel to pivot an L-shaped brake element into braking engagement with the caster wheel periphery. A pawl pivotally mounted on the caster horn is pivoted with the brake element to engage between the teeth of a latch member secured to the caster pintle. The pawl and latch engagement latches the horn to the pintle to prevent relative rotation therebetween.

14 Claims, 7 Drawing Figures

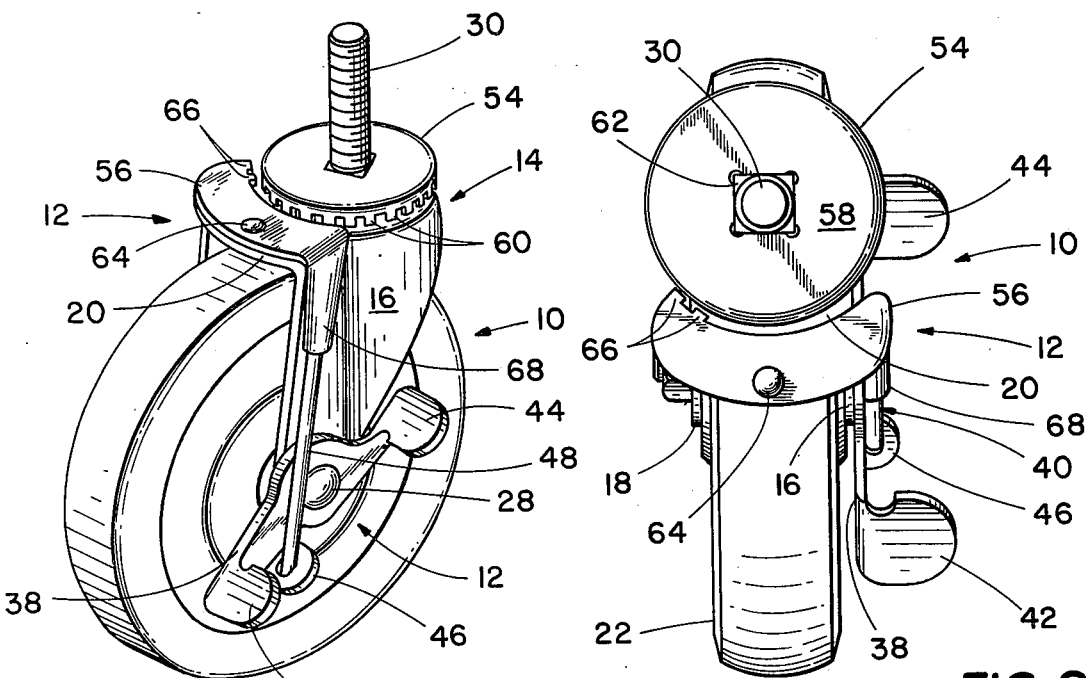
FIG.1
FIG.2
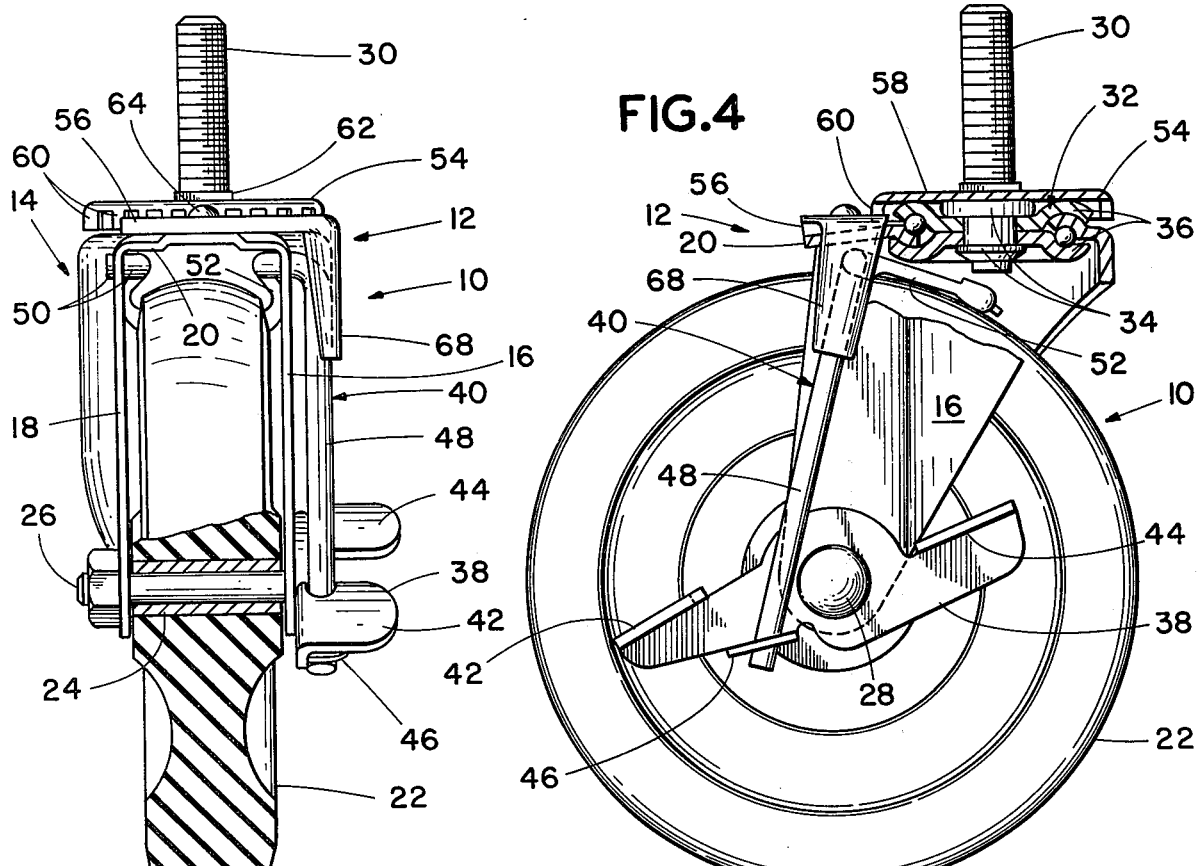
FIG.3
FIG.4

CASTER BRAKE AND LATCH ASSEMBLY

BACKGROUND OF THE INVENTION

1. Field of the Invention

This invention relates in general to caster brakes and more particularly to an improved economical caster brake and latch assembly.

2. Description of the Prior Art

Prior art caster brakes for use on heavy duty casters often incorporate a pivotable treadle for moving a brake element into engagement with the wheel. One such simple, effective and economical arrangement is shown in U.S. Pat. No. 3,687,241. In that patent, the brake element includes a wire spring which is tensed against the treadle in response to pivoting movement of the treadle for holding the wire spring brake element engaged with the wheel. In the described arrangement, however, relative pivotable movement between the horn and pintle could occur resultig in an undesirable movement of the supported structure.

Other caster brakes utilizing complex mechanisms do attempt to prevent the caster horn from pivoting relative the pintle when the brake is operated. The complexity of these arrangements, however, result in expensive casters, which can also be unreliable in operation.

SUMMARY OF THE INVENTION

The present invention, by the simple addition of a pawl, pivoted by the wire spring brake element described in the aforementioned patent, and a latch member attached to the pintle, enables the horn and pintle to be latched against relative pivotal movement therebetween.

The pawl comprises an economical sheet metal member pivotally mounted on the back leg of the caster horn and having a pair of teeth at one end for engaging between teeth on the latch member. An arm on the pawl engages the wire spring brake element so that the pawl pivots towards and away from the pintle in response to movement of the brake element and treadle.

The latch member is a simple cup having teeth formed in its peripheral or rim wall and is easily secured to the pintle by press fitting. In the event the pawl teeth do not align with the spaces between the latch member teeth in response to operation of the brake element, the pawl automatically pivots the latch member and pintle. The pawl teeth then align with the spaces between the latch member teeth and move into position therebetween to latch the brake element until it is delibrately released. The described brake and latch assembly provides a very simple, effective and economical arrangement for braking a caster and latching the caster horn and pintle against relative pivotal movement.

Accordingly, it is a primary object of the present invention to provide an improved and more economical caster brake and latch assembly.

Other objects and features of the present invention will become apparent on examination of the following specification and claims together with the accompanying drawings.

DESCRIPTION OF THE DRAWINGS

FIG. 1 is an isometric view of a caster with a caster brake and latch assembly incorporating the principles of the present invention;

FIG. 2 is a top elevational view of the caster with the brake and latch assembly shown in FIG. 1;

FIG. 3 is a front elevational view partially in section of the caster with the brake and latch assembly shown in FIG. 1;

FIG. 4 is a side elevational view partially in section of the caster with the brake and latch assembly shown in FIG. 1;

DESCRIPTION OF THE PREFERRED EMBODIMENT

Figure 5:
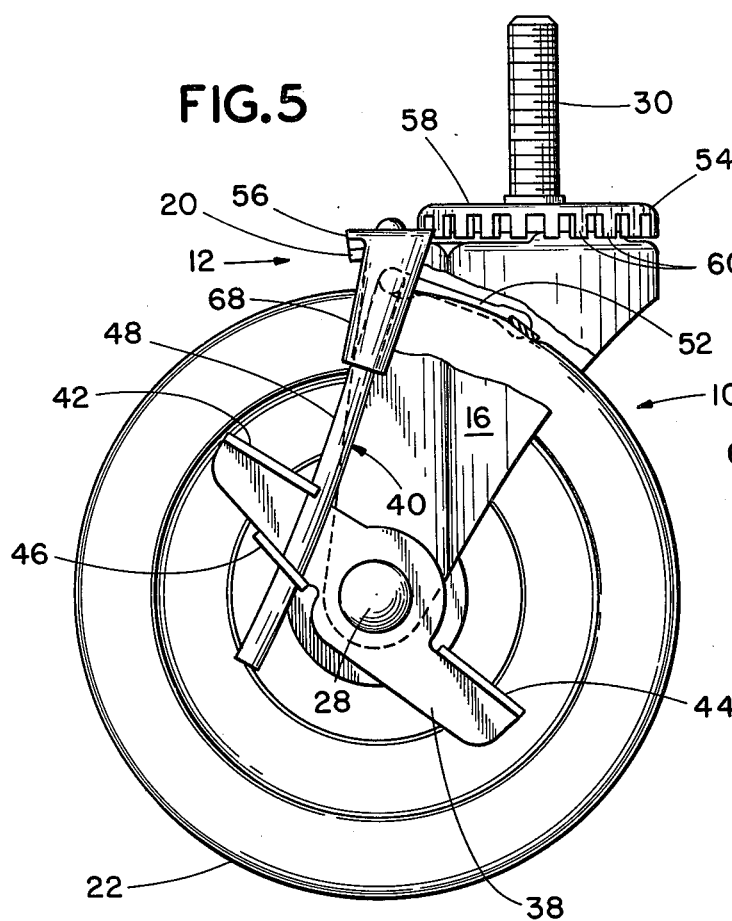
FIG. 5 is a side elevational view partially broken away of the caster shown in FIG. 1, with the brake and latch assembly in operated position.

In FIGS. 1-6 a heavy duty caster incorporating the principles of the present invention is indicated by the reference character 10. The caster 10 carries a brake and latch assembly 12 and comprises a U-shaped caster horn 14 having a pair of end legs 16 and 18 joined by a back leg 20. End legs 16 and 18 rotatably support a caster wheel 22 by means of a bushing 24, seen in FIG. 3. The bushing 24 is carried on a pin 26, having a head 28 at one end and secured in legs 16 and 18 by means of a nut threaded onto the other pin end.

A pintle or stem 30 extends through back leg 20 and has conventional ball bearing assembly 32 secured thereto by means of stem radial heads or flanges 34. The bearing assembly 32 pivotally supports the horn 14 between upper and lower ball races 36. Pintle 30 has a threaded upper end for securing the caster 10 to a portion of the apparatus to be movably supported by the caster 10 with the horn 14 pivotable or rotatable about the pintle axis to the rear of the axis of wheel 22 and perpendicular thereto.

The brake and latch assembly 12 includes a foot operated treadle 38 and an L-shaped wire spring brake element 40. The treadle 38 is pivotally secured on pin 26 between the horn leg 16 and the head 28 of pin 26. A pair of spaced tangs 42 and 44 along the upper edges of treadle 38 form a platform for an operator's foot or hand to grasp the treadle and pivot the same independently of wheel 22. Another tang 46 along the lower edge of treadle 38 has an opening for receiving an end portion of brake element leg 48.

Leg 48 extends in a vertical direction parallel to the plane of wheel 22 to a position just above the periphery of wheel 22, where the other leg 50 of the brake element is formed. Leg 50 extends over a periphery of the wheel and is pivotally supported in caster horn legs 16 and 18 for rotation about an axis perpendicular to the pintle axis. A rearwardly offset portion in the form of a U-shaped bend 52 is located in leg 50 between horn legs 16 and 18. The rear portion of the U-shaped bend 52 is flattened and engages the periphery of the wheel 22 in response to pivoting of the treadle 38, as explained in the aforementioned patent, to brake the caster wheel.

The brake and latch assembly 12 includes two members not shown in the aforementioned patent. One member is a cup-shaped latch member 54 and the other is a pawl 56. Member 54 has a back wall 58 and peripheral or rim wall in which a plurality of teeth 60 are formed, as seen in FIGS. 1, 3, 5 and 7. The teeth 60 are equally spaced completely around the circumference of member 54 to reduce problems in tooth orientation relative the pawl. Wall 58 has a central noncircular or square opening 61 therein, seen best in FIG. 7, for press fitting and/or staking engagement with a correspondingly shaped axial portion 62 on pintle 30, directly above the ball bearing assembly 32 and upper flange 36. The simple cup member 54 is thus easily attached to the stem, with teeth 60 spaced radially outwardly of the bearing assembly 32 and adjacent the back wall 20. The cup member 54 is further captured against the apparatus on which the caster is mounted to further secure the same and presents an aesthetically pleasing appearance.

Pawl 56 is pivotally secured by means of a pin 64 to the horn back leg 20, forward of the pintle 30 and generally coincident with the central plane of the caster passing through the axis of pintle 30. A pair of teeth 66, best seen in FIGS. 1, 2, 6 and 7, dimensioned to fit into the space between teeth 60, are formed adjacent one end of pawl 56 passing over horn leg 18. A vertical or depending arm 68 is integrally formed on the opposite end of pawl 56. Arm 68 extends downwardly along the brake element leg 48 and is folded in an arcuate configuration of a decreasing arc in a descending direction to provide partially encirculing emgagement with arm 48 adjacent the lower end of arm 68 and intermediate the ends of leg 48.

Figure 6:
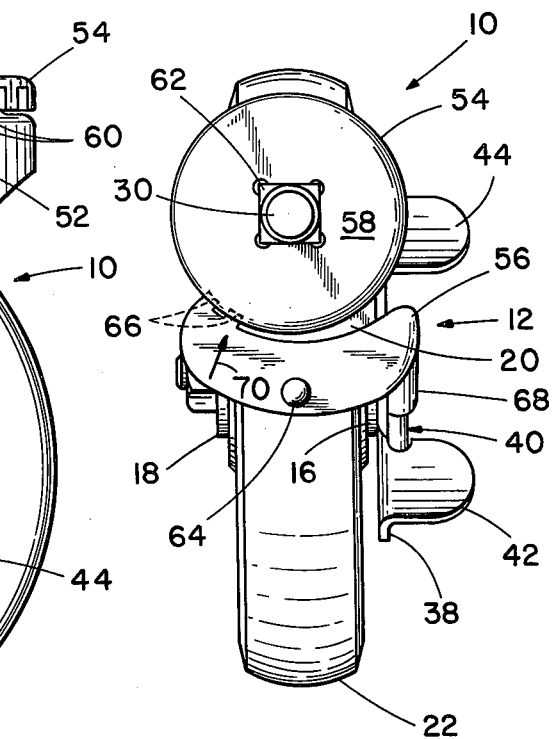
FIG. 6 is a top elevational view of the caster shown in FIG. 1 with the brake and latch assembly in operated position.
Figure 7:
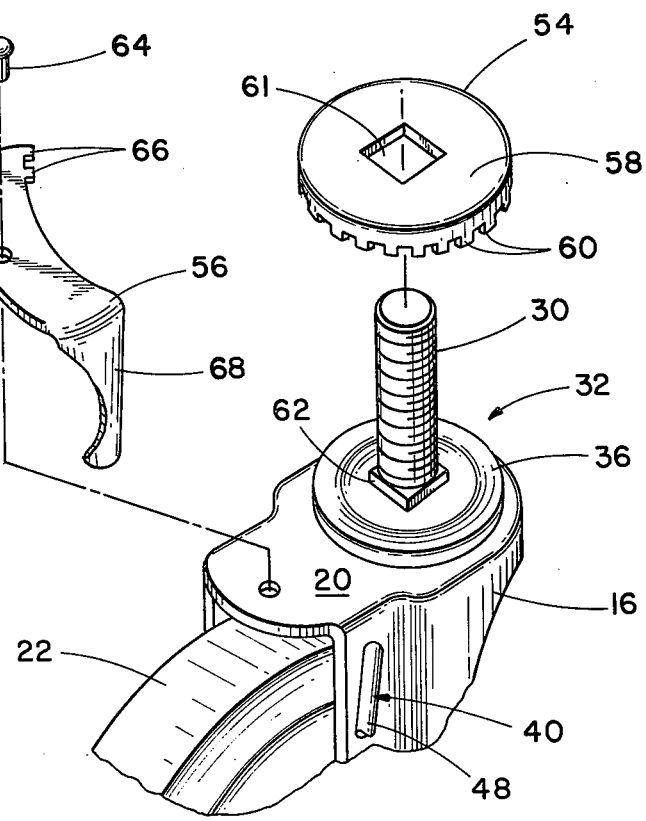
FIG. 7 is an exploded isometric view of the latch pawl and pintle cup member, together with a portion of the caster horn and wheel.

As may be seen from FIGS. 5 and 6, when the treadle 38 is pivoted about the axis of pin 26 in a clockwise direction, the brake element leg 48 is pivoted upwardly or clockwise about the leg 50. Rearwardly offset portion 52 is therefore pivoted downwardly to engage the periphery of wheel 22. This engagement holds the wheel 22 braked, while continued movement of the treadle tenses wire spring leg 48, since the offset portion 52 cannot move. The tension on wire spring leg 48 exerts pressure along the longitudinal axis of the treadle and generally through the axis of pin 26 to thereby normally hold the brake element 40 is its operated position.

Simultaneously with the clockwise pivotal movement of leg 48, the pawl arm 68, which is free to move longitudinally relative leg 48, is translated to the left from the position seen in FIG. 4 to accommodate the movement of leg 48. The pawl 56 is therefore pivoted in a clockwise direction about pivot pin 64, as seen by arrow 70 in FIG. 6, to swing the teeth 66 between the teeth 60. The brake element 40 is now latched in its operated position to the pintle 30 to prevent relative pivotal movement between the caster horn 14 and pintle 30.

It will be noted that if the teeth 66 directly engage the periphery of teeth 60, the engagement is generally offset from the center of teeth 60 and at an obtuse angle to the periphery of member 54. A torquing or pivoting force is accordingly exerted by the pawl 56 on the latch member 54. The horn 14, therefore, pivots relative latch member 54, stem 26 and the bearing assembly 30, and teeth 66 move between teeth 60 to thereafter hold the horn immobile relative the pintle. If teeth 66 engage the face of teeth 60 along the centerline of teeth 60, the force therebetween, indicated by arrow 70, is perpendicular to the curve described by teeth 60. The latch member 54 is therefore frictionally restrained by pawl 56, while the leg 48 is subject to stress between the leg 50 and the end of arm 68 in response to treadle rotation. If, thereafter, the pintle 30 and cup member 54 rotate slightly relative the caster horn, teeth 66 snap into position between teeth 60 in response to the stresses in arm 48 to latch the brake element 40 in its operated position.

To release the brake element 40, the treadle 38 is operated to rotate the treadle from the position shown in FIG. 5 to that shown in FIG. 4. As the treadle 38 moves in a counterclockwise direction, the brake element leg 48 is also pivoted in a counterclockwise direction, as seen in the drawings, to move the offset brake portion 52 from the periphery of wheel 22. Simultaneously, the arm 68, in partially encircling engagement with arm 48, also is translated toward the pintle 30 to pivot pawl 56 from engagement with latch member 54. Wheel 22 and horn 14 of caster 10 are now free to rotate.

The foregoing is a description of an improved caster brake and latch assembly, which can be modified in numerous ways without departing from the inventive concepts set forth in the accompanying claims.

What is claimed is:

1. A brake and latch assembly, comprising; a pintle, a horn rotatably carried by said pintle, said horn rotatably carrying a wheel, brake means rotatably carried by said horn and manually rotatable for engaging the periphery of said wheel to brake said wheel, a latch member secured to said pintle for rotation with said pintle relative to said horn, a pawl, and means rotatably mounting said pawl on said horn about an axis generally parallel to the axis of said pintle independently of said brake means, said pawl being positioned to be engaged by said brake means for rotation in response to rotation of said brake means to engage said pawl with said latch member for thereafter preventing relative rotation between said pintle and horn.

2. The brake and latch assembly claimed in claim 1 in which said latch member comprises a cup having a back wall and a plurality of teeth formed in the peripheral wall of said member with said teeth equally spaced about the circumference of said peripheral wall.

3. The brake and latch assembly claimed in claim 2 in which said horn is U-shaped and includes a back leg with said pintle extending rotatably through the back leg of said horn and said pawl is rotatably supported on said back leg intermediate the ends of said pawl for rotation about said axis parallel to said pintle.

4. The brake and latch assembly claimed in claim 3 in which the back wall of said latch member cup has a noncircular opening therein for press fit engagement with a correspondingly shaped portion of said pintle.

5. The brake and latch assembly claimed in claim 4 in which a ball bearing assembly rotatably supports said pintle in said back leg and said latch member teeth are spaced radially outwardly of said ball bearing assembly.

6. The brake and latch assembly claimed in claim 3 in which said brake means comprises an L-shaped wire having one leg pivotally supported in said horn legs with an offset portion formed in said wire one leg for engaging said wheel.

7. The brake and latch assembly claimed in claim 6 in which said wheel is rotatable about an axis extending through said horn legs, and said brake means inclludes a treadle rotatable about said wheel axis independently of said wheel and engaging the other leg of said L- shaped wire for rotating said offset portion into engagement with said wheel periphery.

8. An improved brake and latch assembly for use with a caster having a pintle rotatably carrying a horn with said horn rotatably carrying a wheel, comprising brake means rotatably carried by said horn and manually rotatable for engaging the periphery of said wheel to brake said wheel, a latch member secured to said pintle for rotation with said pintle relative to said horn, a pawl, means rotatably mounting said pawl on said horn independently of said brake means with said pawl engaged by said brake means for rotation in response to rotation of said brake means to engage said pawl with said latch member for thereafter preventing relative rotation between said pintle and horn, said latch member being a cup having a plurality of teeth formed in the peripheral wall of said member with said teeth equally spaced about the circumference of said peripheral wall, said horn being U-shaped with said pintle extending rotatably through the back leg of said horn and said pawl being rotatably supported on said back leg intermediate said pawl ends for rotation about an axis parallel to the axis of said pintle, said brake means being an L-shaped wire having one leg pivotally supported in said horn legs with an offset portion formed in said wire one leg for engaging said sheel, said wheel being rotatable about an axis extending through said horn legs, and said brake means including a treadle rotatable about said wheel axis, independently of said wheel and engaging the other leg of said L-shaped wire for rotating said offset portion into engagement with said wheel periphery, said pawl having an integrally formed arm in partially encircling engagement with the other leg of said L-shaped wire and being adapted to move longitudinally relative to said other L-shaped wire leg.

9. A brake and latch assembly, comprising; a caster horn having side legs, a caster wheel rotatably carried by said side legs, said caster horn having a back leg rotatably carrying a pintle for rotation about an axis perpendicular to the axis of said wheel, a latch member secured to said pintle for rotation with said pintle, a treadle manually pivotable independently of said wheel about an axis perpendicular to said pintle, a brake element pivotally supported by said horn for pivotable movement about an axis perpendicular to said pintle, said treadle engaging said brake element to pivot said brake element into engagement with said wheel in response to pivotable movement of said treadle in one direction, a pawl pivotably supported by said horn for pivotable movement about an axis parallel to said pintle axis and closely adjacent said wheel, and means on said pawl engaging said brake element for pivoting said pawl in response to pivotable movement of said brake element for engaging said wheel to engage said pawl with said latch member to prevent rotation of said pintle relative to said horn, the pivotal axis of said pawl substantially intersecting the pivotal axis of said brake element.

10. A brake and latch assembly, comprising; a caster horn rotatably carrying a caster wheel, a pintle rotatably carrying said caster wheel for rotation about an axis perpendicular to the axis of said wheel, a latch member secured to said pintle for rotation with said pintle, a brake element pivotally supported by said horn closely adjacent said wheel for pivotal movement in one direction into engagement with said wheel to brake said wheel, means carried by said horn for pivoting said brake element in said one direction and for holding said brake element engaged with said wheel, a pawl pivotally supported by said horn independently of said brake element about an axis parallel to the axis of said pintle and closely adjacent said wheel, and means on said pawl engaging said brake element for pivoting said pawl in response to pivotal movement of said brake element in said one direction to engage said pawl between said latch member teeth whereby relative rotation is prevented between said pintle and horn.

11. The brake and latch assembly claimed in claim 10 in which said latch member comprises a cup member having a peripheral wall in which a plurality of equally spaced teeth are formed and a back wall in which a non-circular opening is formed for press fitting engagement with said pintle.

12. The brake and latch assembly claimed in claim 11 in which said pawl comprises a sheet metal member pivotally supported intermediate opposite ends and having teeth adjacent one end for engagement between said latch member teeth, and said means on said pawl is an integrally formed depending arm.

13. The brake and latch assembly claimed in claim 12 in which said pawl teeth are adapted to engage said latch member teeth to rotate said latch member for aligning said pawl teeth with the spaces between said latch member teeth.

14. A brake and latch assembly, comprising: a caster horn having legs, a caster wheel rotatably carried by said legs, a back leg rotatably carrying a pintle for rotation about an axis perpendicular to the axis of said wheel, a latch member secured to said pintle for rotation with said pintle and having a plurality of teeth spaced radially outwardly of said pintle, a treadle, means mounting said treadle for pivotal movement about the axis of said wheel independently of said wheel, an L-shaped brake element having one leg pivotally supported by said horn legs for pivotal movement about an axis perpendicular to said pintle and the other element leg extending parallel to one horn leg to engage said treadle, said one leg having an offset portion for engaging the periphery of said wheel in response to pivotal movement of said treadle in one direction to pivot said brake element in a corresponding direction, a pawl pivotable about an axis offset from and parallel to said pintle axis and closely adjacent said wheel with said pawl having a tooth at one end, and an arm integrally formed on the other end of said pawl engaging said brake element other leg for pivoting said pawl in direct response to pivotal movement of said brake element to thereby engage said pawl tooth between said latch member teeth to prevent relative rotation between said pintle and said horn.

* * * * *